United States Patent
Gao et al.

(10) Patent No.: US 12,468,331 B2
(45) Date of Patent: Nov. 11, 2025

(54) REAL-TIME SLIDING ULTRASHORT-TERM FORECAST MODEL ALGORITHM BASED ON FREQUENCY DATA AND PHASE DATA

(71) Applicants: Chengdu University of Technology, Chengdu (CN); Wuhan University, Wuhan (CN)

(72) Inventors: Yaping Gao, Chengdu (CN); Wenju Fu, Chengdu (CN); Guo Chen, Chengdu (CN); Weige Zi, Chengdu (CN); Jiapeng Li, Chengdu (CN); Pengcheng Zhao, Chengdu (CN)

(73) Assignees: Chengdu University of Technology, Chengdu (CN); Wuhan University, Wuhan (CN)

( * ) Notice: Subject to any disclaimer, the term of this patent is extended or adjusted under 35 U.S.C. 154(b) by 71 days.

(21) Appl. No.: 18/421,435

(22) Filed: Jan. 24, 2024

(65) Prior Publication Data

US 2025/0224759 A1    Jul. 10, 2025

Related U.S. Application Data

(63) Continuation of application No. PCT/CN2024/071286, filed on Jan. 9, 2024.

(51) Int. Cl.
   *G06F 1/08*    (2006.01)
(52) U.S. Cl.
   CPC ................... *G06F 1/08* (2013.01)

(58) Field of Classification Search
   CPC ................... G06F 1/12; G06F 1/10
   See application file for complete search history.

(56) References Cited

U.S. PATENT DOCUMENTS

| | | | | |
|---|---|---|---|---|
| 2004/0162046 | A1* | 8/2004 | Yamauchi | H04W 52/029 455/260 |
| 2012/0289242 | A1* | 11/2012 | McCarthy | H04B 17/309 455/524 |
| 2013/0223496 | A1* | 8/2013 | Buhl | H04L 1/205 375/224 |
| 2015/0362597 | A1* | 12/2015 | Syrjärinne | G01S 19/27 342/357.58 |

\* cited by examiner

*Primary Examiner* — Phil K Nguyen
(74) *Attorney, Agent, or Firm* — WPAT, PC

(57) ABSTRACT

The present application relates to the field of satellite navigation systems, and discloses a real-time sliding ultrashort-term forecast model algorithm based on frequency data and phase data. The real-time sliding ultrashort-term forecast model algorithm based on frequency data and phase data includes: S1, converting clock error phase data into the frequency data; S2, processing the frequency data through a frequency anomaly detection function, and eliminating an abnormal value, where the frequency anomaly detection function determines whether the frequency data is an outlier according to a standard deviation and a threshold of the frequency data; and S3, performing a real-time sliding clock error forecast, and eliminating the abnormal value and updating a forecast epoch by using fitted phase data and a threshold range.

6 Claims, 3 Drawing Sheets

REAL-TIME SLIDING ULTRASHORT-TERM FORECAST MODEL ALGORITHM BASED ON FREQUENCY DATA AND PHASE DATA

TECHNICAL FIELD

The present disclosure relates to the technical field of satellite navigation systems, and in particular to a real-time sliding ultrashort-term forecast model algorithm based on frequency data and phase data.

BACKGROUND

With its significant role in modern society, a satellite navigation system is widely used in aviation, navigation, vehicle navigation and other fields. It provides precise positioning and navigation services in the fields of aviation, navigation and vehicle navigation, leading us to accurately find destinations in unfamiliar environments. As an important parameter in the satellite navigation system, the satellite clock error directly affects the accuracy of positioning and navigation. Therefore, it is crucial to accurately forecast changes in satellite clock errors to ensure the high accuracy and reliability of the navigation system.

A conventional satellite clock error forecast method mainly relies on statistical analysis or mathematical modeling through historical data. These methods can provide a forecast result to some extent by analyzing and modeling historical data. Yet, these methods have some limitations. First, they usually require a long period of data accumulation and offline processing, which cannot satisfy the requirement for real-time performance. The real-time performance is critical in application scenarios that require instant navigation and positioning. Secondly, due to changes in environments and systems, statistical features of historical data may change, resulting in a decrease in the accuracy of forecast results. This uncertainty may pose potential risks and safety hazards to the navigation system.

Furthermore, conventional forecast methods are relatively weak in dealing with anomalous data. In real applications, satellite clock error data may be affected by a variety of noises and disturbances, including measurement errors, signal attenuation, atmospheric disturbances, and so on. These abnormal values may adversely affect the forecast results and reduce the reliability of the forecast.

SUMMARY

As for the defects of the prior art, the present disclosure provides a real-time sliding ultrashort-term forecast model algorithm based on frequency data and phase data, to improve accuracy, real-time performance, data stability and flexibility of a satellite clock error forecast. Satellite clock error phase data received in real time is converted into the frequency data, abnormal values are eliminated using a frequency anomaly detection function, and a real-time sliding clock error forecast is performed.

In order to achieve the above objective, the present disclosure is achieved through the following technical solution: a real-time sliding ultrashort-term forecast model algorithm based on frequency data and phase data includes:
converting clock error phase data into the frequency data;
processing the frequency data through a frequency anomaly detection function, and eliminating an abnormal value, where the frequency anomaly detection function determines whether the frequency data is an outlier according to a standard deviation and a threshold of the frequency data; and
performing a real-time sliding clock error forecast, and eliminating the abnormal value and updating a forecast epoch by using fitted phase data and a threshold range.

Optionally, a calculation formula for converting the clock error phase data into the frequency data is as follows:

$$f_i = y_i - y_{i-1},$$

where $f_i$ represents frequency data of an i-th epoch, $y_i$ represents phase data of the i-th epoch, and $y_{i-1}$ represents phase data of a previous epoch.

Optionally, the updating the forecast epoch includes:
inputting first 40 epochs, performing preliminary fitting, and obtaining 40 fitting residuals;
replacing the frequency data with the fitted phase data, and performing iterative processing, so as to eliminate gross errors from the fitted data and update the threshold;
calculating a root mean square error of the fitting residuals as a basis for setting the threshold; and
determining whether the fitting residual of the forecast epoch is beyond the threshold range, if the fitting residual of the forecast epoch is beyond the threshold range, eliminating data of the epoch, if the fitting residual of the forecast epoch is not beyond the threshold range, sliding forward by one epoch, and performing fitting and forecast again.

Optionally, the replacing the frequency data with the fitted phase data, and performing the iterative processing, so as to eliminate the gross errors from the fitted data and update the threshold specifically include:
calculating standard deviation values of all the frequency data, where a calculation formula for calculating the standard deviation values of all the frequency data is as follows:

$$\text{sigma} = \sqrt{\sum (f_i - ave)^2 / n - 2},$$

where ave represents an average of all the frequency data, and n represents the total number of the frequency data;
eliminating frequency data farthest from $f_{m0}$ to satisfy a condition $f_{m0} = \text{MAX}(\text{fabs}(f_n - ave))$, and calculating the updated sigma again;
designing different thresholds according to the updated sigma and different satellite orbit types;
determining whether $\text{fabs}(f_{m0} - ave)$ is greater than the threshold, and if $\text{fabs}(f_{m0} - ave)$ is greater than the threshold, considering that $f_{m0}$ is a frequency outlier; and
continuing iterating a next frequency maximum point $f_{m1}$ until no epoch is beyond the threshold.

Optionally, a calculation formula of the threshold is as follows:

$$\text{Threshold} = \begin{cases} \mu^* \text{sigma} + \eta_{orbit}, & \text{hour-boundary epochs} \\ \mu^* \text{sigma}, & \text{other normal epochs} \end{cases},$$

where μ represents a constant set to be 3; and $\eta_{orbit}$ represents an empirical threshold set according to the satellite orbit type.

Optionally, as for a medium earth orbit (MEO)/inclined geosynchronous orbit (IGSO)/geostationary orbit (GEO), the empirical thresholds are 0, $0.016*10^{-9}$, $0.033*10^{-9}$ respectively.

Optionally, a calculation formula of the step of the calculating the root mean square error of the fitting residuals as the basis for setting the threshold is as follows:

$$RMS = \sqrt{\sum (y_i - x_i)^2 / n_1},$$

where $y_i$ represents actual phase data, $x_i$ represents fitted phase data, and $n_1$ represents the number of data points.

The present disclosure further provides a device for a real-time sliding ultrashort-term forecast model algorithm based on frequency data and phase, including:
- a data reception module used for receiving clock error phase data of a satellite;
- a frequency conversion module used for converting the clock error phase data into the frequency data;
- a frequency anomaly detection module used for determining whether the frequency data has an outlier according to a standard deviation and a threshold of the frequency data; and
- a forecast module used for performing a real-time sliding clock error forecast, including calculation of fitted phase data and elimination of an abnormal value.

The present disclosure further provides a computer apparatus, including a memory, a processor, and a computer program stored on the memory and executable on the processor. The processor implements the above method when executing the computer program.

The present disclosure further provides a storage medium, storing a computer program. The computer program implements the above method when executed by a processor.

The present disclosure provides a real-time sliding ultrashort-term forecast model algorithm based on frequency data and phase data. The present disclosure has the following beneficial effects:

1. According to the present disclosure, elimination of a clock data abnormal value and calculation of a clock error forecast value are linked, and the abnormal value of the real-time rolling clock data is detected and eliminated. The real-time clock error forecast value is calculated, such that a clock frequency deviation is corrected, and forecast accuracy, real-time performance and data stability can be improved. Moreover, flexibility is provided, and the present disclosure is applicable to various satellite orbit types.

2. By determining the fitted phase data and the threshold range, data points with larger fitting residuals are eliminated, such that accuracy of a forecast is improved. A real-time sliding forecast mode is used, such that a forecast result can be updated in time to adapt to dynamically changing data. Furthermore, the threshold is set according to the satellite orbit type, such that a forecast model adapts to different satellite orbit types, and adaptability and flexibility of the algorithm are improved.

100, data reception module; 200, frequency conversion module; 300, frequency anomaly detection module; 400, forecast module; 40, computer apparatus; 41, processor; 42, memory; and 43, storage medium.

DETAILED DESCRIPTION OF THE EMBODIMENTS

The technical solutions of the examples of the present disclosure are clearly and completely described below with reference to the drawings of the specification of the present disclosure. Apparently, the described examples are merely some examples rather than all examples of the present disclosure. Based on the examples of the present disclosure, all other examples acquired by those of ordinary skill in the art without making creative efforts fall within the scope of protection of the present disclosure.

In order to overcome limitation of a traditional method, the present disclosure provides a real-time sliding ultrashort-term forecast model, to improve accuracy, real-time performance, data stability and flexibility of a satellite clock error forecast. In the model, satellite clock error phase data received in real time is converted into the frequency data, abnormal values are eliminated using a frequency anomaly detection function, and a real-time sliding clock error forecast is performed. Compared with the traditional method, the model according to the present disclosure can better adapt to dynamically changing data and provide more accurate and real-time satellite clock error forecast results.

Figure 1:
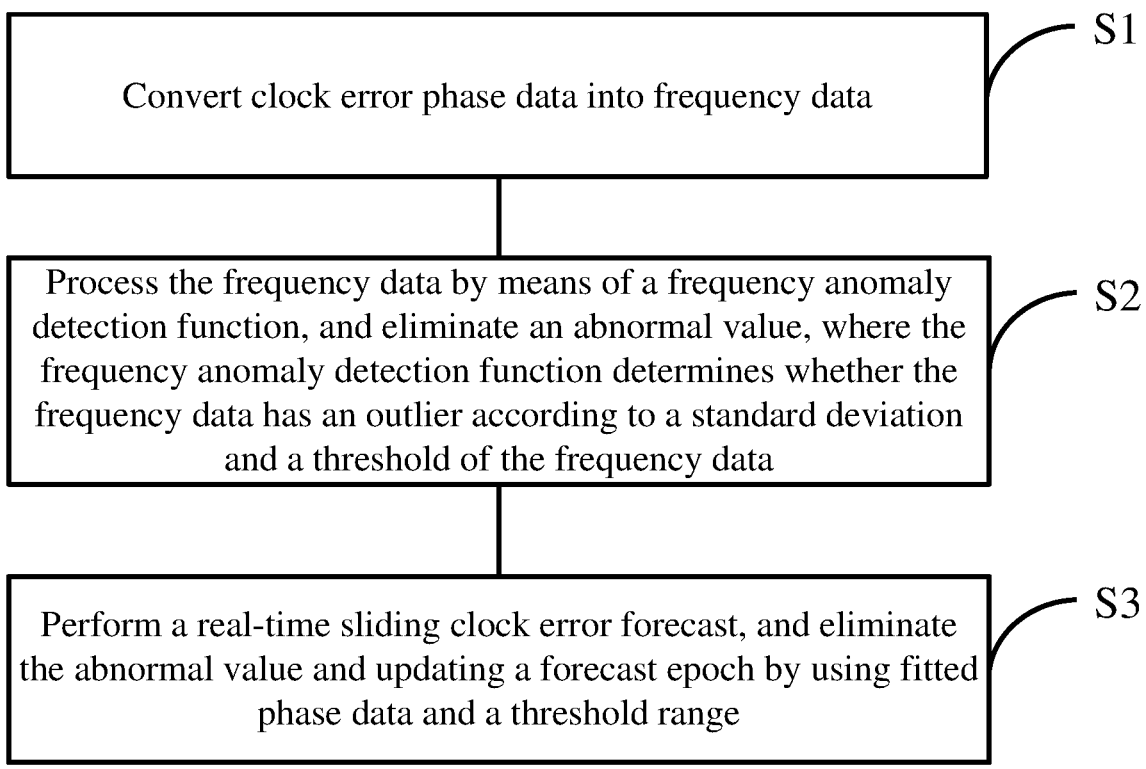
FIG. 1 is one schematic flowchart according to the present disclosure.
Figure 2:
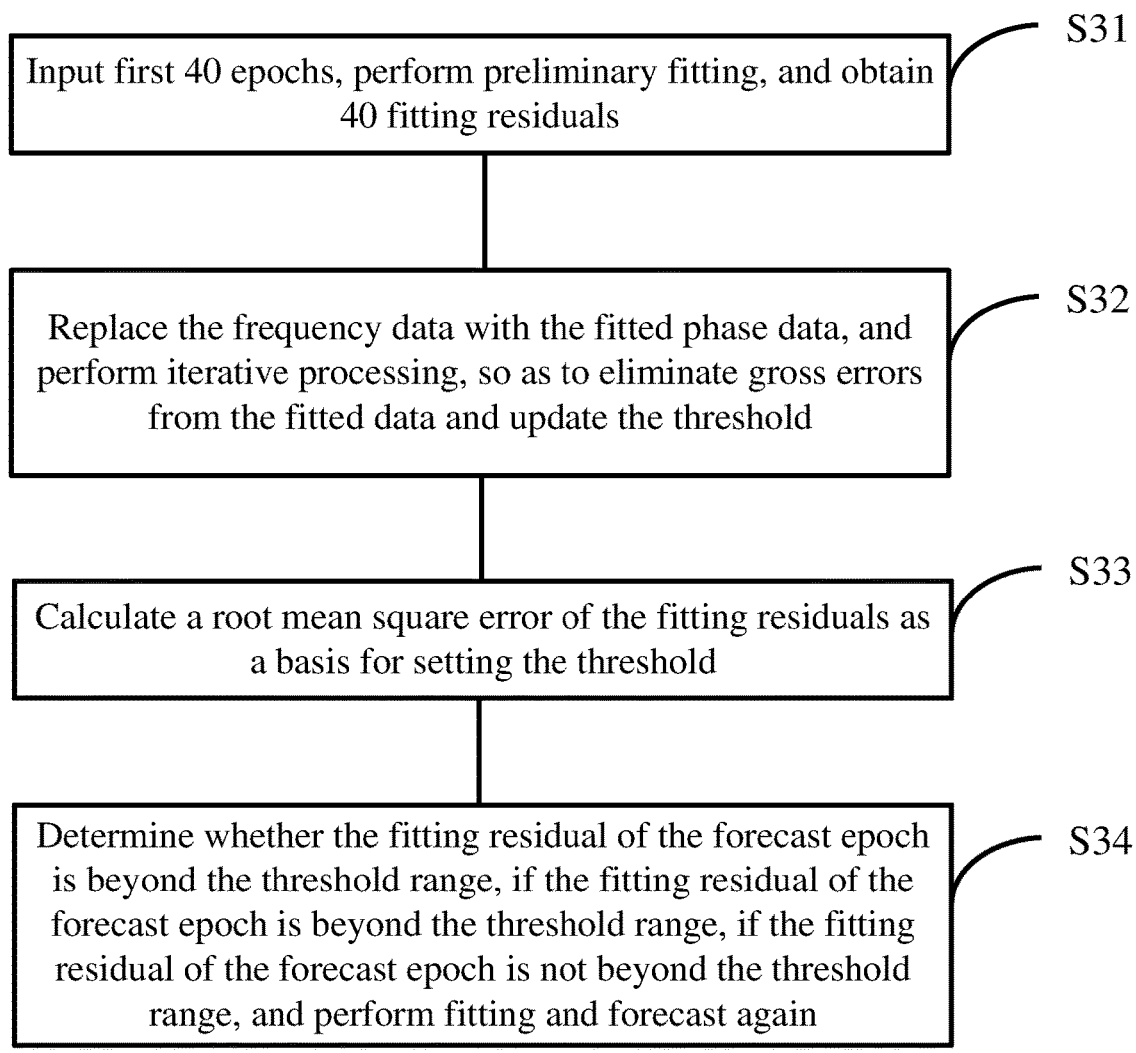
FIG. 2 is another schematic flowchart according to the present disclosure.

With reference to FIGS. 1-2, an embodiment of the present disclosure provides a real-time sliding ultrashort-term forecast model algorithm based on frequency data and phase data, including S1-S3.

S1, converting clock error phase data into the frequency data.

Specifically, a calculation formula for converting the clock error phase data into the frequency data in the example is as follows:

$$f_i = y_i - y_{i-1},$$

where $f_i$ represents frequency data of an i-th epoch, $y_i$ represents phase data of the i-th epoch, and $y_{i-1}$ represents phase data of a previous epoch.

The clock error phase data is converted into the frequency data, such that the data is easier to process and analyze, and information about a clock error change rate may be provided, which is of great significance for a forecast.

S2, processing the frequency data through a frequency anomaly detection function, and eliminating an abnormal value, where the frequency anomaly detection function determines whether the frequency data is an outlier according to a standard deviation and a threshold of the frequency data.

Specifically, the frequency data is processed through the frequency anomaly detection function, and an abnormal value is eliminated, Determination is performed according to the standard deviation of the frequency data and the preset threshold. When frequency data of a certain epoch is beyond the threshold, the frequency data is determined as an outlier and is eliminated.

The abnormal value is eliminated from the frequency data, and noise interference is reduced, such that the accuracy and reliability of the data are improved. Through anomaly detection, abnormal data caused by apparatus failure, signal interference or other factors can be eliminated to guarantee accuracy of a forecast model.

S3, performing a real-time sliding clock error forecast, and eliminating the abnormal value and updating a forecast epoch by using fitted phase data and a threshold range.

Specifically, specific steps of the S3 are as follows:

S31, inputting first 40 epochs, perform preliminary fitting, and obtaining 40 fitting residuals; and S32, replacing the frequency data with the fitted phase data, and performing iterative processing, so as to eliminate gross errors from the fitted data and update the threshold.

Specifically, specific steps of the S32 in the example are as follows:

S321, calculating standard deviation values of all the frequency data, where a calculation formula for calculating the standard deviation values of all the frequency data is as follows:

$$\text{sigma} = \sqrt{\sum (f_i - ave)^2 / n - 2},$$

where ave represents an average of all the frequency data, and n represents the total number of the frequency data.

S322, eliminating frequency data farthest from $f_{m0}$ to satisfy a condition $f_{m0}=\text{MAX}(\text{fabs}(f_n-\text{ave}))$, and calculating the updated sigma again.

S323, designing different thresholds according to the updated sigma and different satellite orbit types. A thresholds formula in the example is as follows:

$$\text{Threshold} = \begin{cases} \mu^* \text{ sigma} + \eta_{orbit}, & \text{hour-boundary epochs} \\ \mu^* \text{ sigma}, & \text{other normal epochs} \end{cases},$$

where μ represents a constant set to be 3; and $\eta_{orbit}$ represents an empirical threshold set according to the satellite orbit type.

Specifically, as for a medium earth orbit (MEO)/inclined geosynchronous orbit (IGSO)/geostationary orbit (GEO), the empirical thresholds are 0, $0.016*10^{-9}$, $0.033*10^{-9}$ respectively.

S324, determining whether $\text{fabs}(f_{m0}-\text{ave})$ is greater than the threshold, and if $\text{fabs}(f_{m0}-\text{ave})$ is greater than the threshold, considering that $f_{m0}$ is a frequency outlier.

S325, continuing iterating a next frequency maximum point $f_{m1}$ until no epoch is beyond the threshold.

S33, calculating a root mean square error of the fitting residuals as a basis for setting the threshold. A formula for calculating the root mean square error of the fitting residuals in the example is as follows:

$$\text{RMS} = \sqrt{\sum (y_i - x_i)^2 / n_1},$$

where $y_i$ represents actual phase data, $x_i$ represents fitted phase data, and $n_1$ represents the number of data points.

S34, determining whether the fitting residual of the forecast epoch is beyond the threshold range, if the fitting residual of the forecast epoch is beyond the threshold range, eliminating data of the epoch, if the fitting residual of the forecast epoch is not beyond the threshold range, sliding forward by one epoch, and performing fitting and forecast again.

According to the example of the present disclosure, by determining the fitted phase data and the threshold range, data points with larger fitting residuals are eliminated, such that accuracy of a forecast is improved. A real-time sliding forecast mode is used, such that a forecast result can be updated in time to adapt to dynamically changing data. Furthermore, the threshold is set according to the satellite orbit type, such that a forecast model adapts to different satellite orbit types, and adaptability and flexibility of the algorithm are improved.

In general, according to the present disclosure, elimination of a clock data abnormal value and calculation of a clock error forecast value are linked, and the abnormal value of the real-time rolling clock data is detected and eliminated. The real-time clock error forecast value is calculated, such that a clock frequency deviation is corrected, and forecast accuracy, real-time performance and data stability can be improved. Moreover, flexibility is provided, and the present disclosure is applicable to various satellite orbit types.

A device for a real-time sliding ultrashort-term forecast model algorithm based on frequency data and phase data described below and the real-time sliding ultrashort-term forecast model algorithm based on frequency data and phase data described above may be correspondingly referenced to each other.

Figure 3:
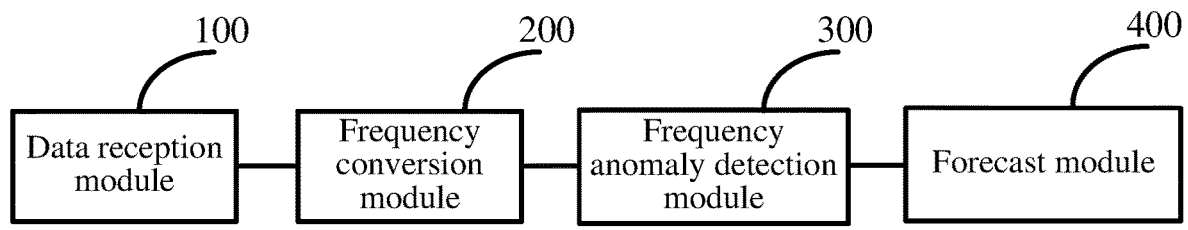
FIG. 3 is a schematic structural diagram of a device according to the present disclosure.

With reference to FIG. 3, the present disclosure provides a device for a real-time sliding ultrashort-term forecast model algorithm based on frequency data and phase, including:

a data reception module 100 used for receiving clock error phase data of a satellite. Satellite clock error phase data may be obtained through a satellite navigation system or other related apparatuses and transmitted to a subsequent processing module for analysis and forecast.

A frequency conversion module 200 used for converting the clock error phase data into the frequency data. Corresponding frequency data may be obtained by processing and calculating the clock error phase data. Such conversion may provide information about a clock error change rate, and provide input to a subsequent forecast module.

A frequency anomaly detection module 300 used for determining whether the frequency data has an outlier according to a standard deviation and a threshold of the frequency data. By performing statistical analysis on the frequency data, the standard deviation of the frequency data may be calculated and compared to the preset threshold. When the frequency data is beyond a threshold range, the frequency data is determined as an outlier and needs further processing.

A forecast module 400 used for performing a real-time sliding clock error forecast. The forecast module 400 includes two main steps of calculation of fitted phase data and elimination of an abnormal value. Firstly, a trend and a variation rule of clock errors can be obtained by fitting the phase data. Then, according to the preset threshold and fitting results, data points with larger fitting residuals are eliminated to improve accuracy of the forecast. Such forecast module can update forecast results in real time and adapt to dynamically changing data.

The device in the example may be used to execute the above method example, and have similar principles and technical effects, which will not be repeated herein.

Figure 4:
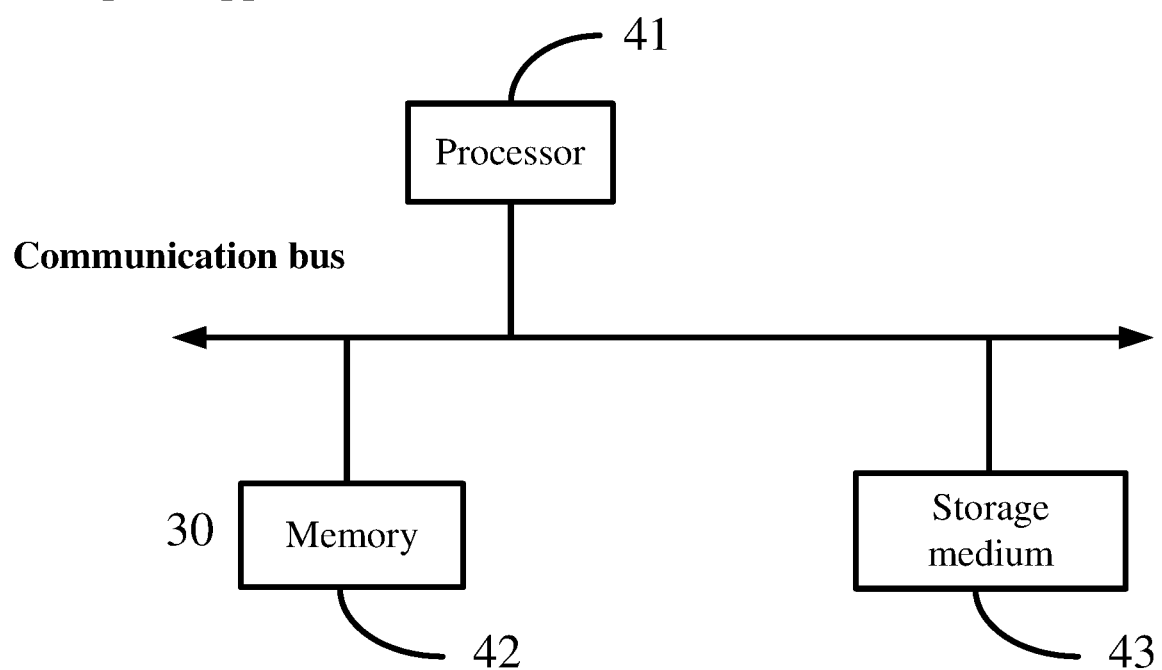
FIG. 4 is a schematic structural diagram of a computer apparatus according to the present disclosure.

With reference to FIG. 4, the present disclosure further provides a computer apparatus 40, including a processor 41 and a memory 42. The memory 42 stores a computer program executable by the processor, and the computer program executes the above method when executed by the processor.

The present disclosure also provides a storage medium 43. The storage medium 43 stores a computer program, and the computer program executes the above method when executed by the processor 41.

The storage medium 43 may be implemented by any type of volatile or non-volatile memory apparatus, or a combination of them, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

Although examples of the present disclosure have been shown and described, it will be understood to those of ordinary skill in the art that various changes, modifications, substitutions and variations may be made to these examples without departing from the principles and spirit of the present disclosure, the scope of the present disclosure is defined by the appended claims and their equivalents.

What is claimed is:

1. A real-time sliding ultrashort-term forecast model algorithm based on frequency data and phase data, executed by a processor of a computer apparatus, and the real-time sliding ultrashort-term forecast model algorithm based on frequency data and phase data comprising:
converting clock error phase data from a satellite navigation system into the frequency data;
iteratively processing the frequency data to eliminate frequency outliers from the frequency data, comprising:
calculating a standard deviation value of the frequency data, wherein a calculation formula for calculating the standard deviation value of the frequency data is as follows:

$$\mathrm{sigma} = \sqrt{\sum (f_i - ave)^2 / n - 2},$$

wherein sigma represents the standard deviation value of the frequency data, ave represents an average of the frequency data, $f_i$ represents one of the frequency data, and n represents a total number of the frequency data;
eliminating a target frequency data $f_{m0}$ farthest from the average ave of the frequency data from the frequency data to satisfy a condition $f_{m0}=\mathrm{MAX}(\mathrm{fabs}(f_n-ave))$ to thereby obtain updated frequency data, and updating the sigma based on the updated frequency data to obtain an updated sigma;
designing different thresholds according to the updated sigma and different satellite orbit types;
determining whether $\mathrm{fabs}(f_{m0}-ave)$ is greater than a corresponding one threshold of the different thresholds;
in response to fabs $(f_{m0}-ave)$ being greater than the corresponding one threshold of the different thresholds, considering that $f_{m0}$ is a frequency outlier; and
continuing iterating a next frequency maximum point $f_{m1}$ until no epoch is beyond a corresponding threshold;
performing a real-time sliding clock error forecast to update a forecast epoch, comprising:
calculating a root mean square error of fitting residuals as a basis for setting a threshold range; and
determining whether a fitting residual of the forecast epoch is beyond the threshold range;
in response to the fitting residual of the forecast epoch being beyond the threshold range, eliminating data of the forecast epoch; and
in response to the fitting residual of the forecast epoch being not beyond the threshold range, sliding forward by one epoch, and performing fitting and forecast again; and
using a real-time clock error forecast value obtained through performing the forecast to correct a clock frequency deviation, for thereby improving forecast accuracy, real-time performance and data stability of a satellite clock error.

2. The real-time sliding ultrashort-term forecast model algorithm based on frequency data and phase data according to claim 1, wherein a calculation formula for converting the clock error phase data from a satellite navigation system into the frequency data is as follows:

$$f_i = y_i - y_{i-1}$$

wherein $f_i$ represents frequency data of an i-th epoch, $y_i$ represents phase data of the i-th epoch, and $y_{i-1}$ represents phase data of an (i−1)-th epoch.

3. The real-time sliding ultrashort-term forecast model algorithm based on frequency data and phase data according to claim 1, comprising:
before the calculating a root mean square error of fitting residuals as a basis for setting the threshold range, inputting first 40 epochs, and performing preliminary fitting to obtain the fitting residuals.

4. The real-time sliding ultrashort-term forecast model algorithm based on frequency data and phase data according to claim 1, wherein a calculation formula for designing the different thresholds according to the updated sigma and the different satellite orbit types is as follows:

$$\mathrm{Threshold} = \begin{cases} \mu^* \text{ sigma} + \eta_{orbit}, & \text{hour-boundary epochs} \\ \mu^* \text{ sigma}, & \text{other normal epochs} \end{cases}$$

wherein μ represents a constant set to be 3; and $\eta_{orbit}$ represents an empirical threshold set according to a corresponding one of the different satellite orbit types.

5. The real-time sliding ultrashort-term forecast model algorithm based on frequency data and phase data according to claim 4, wherein as for a medium earth orbit (MEO), an inclined geosynchronous orbit (IGSO), and a geostationary orbit (GEO), the empirical thresholds are 0, $0.016*10^{-9}$, and $0.033*10^{-9}$ respectively.

6. The real-time sliding ultrashort-term forecast model algorithm based on frequency data and phase data according to claim 1, wherein a calculation formula for calculating the root mean square error of the fitting residuals as the basis for setting the threshold range is as follows:

$$RMS = \sqrt{\sum (y_i - x_i)^2 / n_1}$$

wherein $y_i$ represents actual phase data, $x_j$ represents fitted phase data, and $n_1$ represents a total number of data points.

\* \* \* \* \*